(12) United States Patent
Komaki

(10) Patent No.: US 6,973,129 B2
(45) Date of Patent: Dec. 6, 2005

(54) OVERLAPPED FIELD DETECTING APPARATUS CAPABLE OF DETECTING NON-OVERLAPPED FIELDS MOSTLY OVERLAPPED

(75) Inventor: Kaoru Komaki, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 622 days.

(21) Appl. No.: 10/157,614

(22) Filed: May 29, 2002

(65) Prior Publication Data

US 2002/0180888 A1  Dec. 5, 2002

(30) Foreign Application Priority Data

May 30, 2001  (JP) .............................. 2001-162623

(51) Int. Cl.[7] .............................................. H04B 1/66
(52) U.S. Cl. .................................. 375/240.15; 348/700
(58) Field of Search ...................... 375/240.01, 240.03, 375/240.15, 240.16; 348/699, 700

(56) References Cited

U.S. PATENT DOCUMENTS 5,245,424 A * 9/1993 Yoshida ...................... 348/128
6,490,497 B1 * 12/2002 Mitsuhashi et al. .......... 700/121
6,611,286 B1 * 8/2003 Terasawa et al. ........... 348/220.1

FOREIGN PATENT DOCUMENTS

| JP | 9-55879 | 2/1997 |
|---|---|---|
| JP | 11-88893 | 3/1999 |

* cited by examiner

Primary Examiner—Tung Vo

(74) Attorney, Agent, or Firm—Scully, Scott, Murphy & Presser

(57) ABSTRACT

In an overlapped field detecting apparatus, a delay unit delays a video signal, and a subtracter calculates a difference between the video signal and an output signal of the delay unit on a pixel-by-pixel basis. Also, an absolute value circuit calculates an absolute value of the difference on a pixel-by-pixel basis. Further, at least one comparator compares the absolute value of the difference with a threshold value on a pixel-by-pixel basis, and at least one accumulator counts a number of pixels when the absolute value of the difference is larger than the threshold value. A determination unit determines whether or not the number of pixels is larger than a definite value, thus determining that corresponding fields of two successive frames of the video signal are non-overlapped.

25 Claims, 12 Drawing Sheets

OVERLAPPED FIELD DETECTING APPARATUS CAPABLE OF DETECTING NON-OVERLAPPED FIELDS MOSTLY OVERLAPPED

BACKGROUND OF THE INVENTION

1. Field of the Invention

The present invention relates to a data compression system, and more particularly, to the improvement of an overlapped field detecting apparatus thereof.

2. Description of the Related Art

Generally, a cinema signal having 24 exposure frames per second is converted by a 3:2 pull-down system into a video signal having 60 fields per second based upon the National Television System Committee (NTSC) system. This video signal is called a telecine signal. Such a telecine signal includes overlapped fields, and therefore, overlapped fields are detected and removed before performing a data compression process thereupon. For this purpose, an overlapped field detecting apparatus is provided in a data compression system, which will be explained later in detail.

In prior art overlapped field detecting apparatuses (see: JP-A-9-55879 & JP-A-11-88893), a delay unit delays a video signal, and a subtracter calculates a difference between the video signal and an output signal of the delay unit on a pixel-by-pixel basis. Also, an absolute value circuit calculates an absolute value of the difference on a pixel-by-pixel basis. Further, an accumulator calculates a sum of the absolute values, and a comparator compares the sum of the absolute values per field. A comparator compares the sum of the absolute values with a definite value, thus determining that corresponding fields of two successive frames of the video signal are non-overlapped. This also will be explained later in detail.

In the above-described prior art overlapped field detecting apparatuses, however, since the sum calculated by the accumulator reflects the average value of the absolute values multiplied by the number of pixels per field, the output signal of the comparator cannot accurately discriminate overlapped fields from non-overlapped fields. Particularly, non-overlapped fields have a large part in common with only a small different part are determined to be overlapped. In order to discriminate such non-overlapped fields from overlapped fields, the threshold value can be made lower; however, in this case, overlapped fields with noise are determined to be non-overlapped.

SUMMARY OF THE INVENTION

It is an object of the present invention to provide an overlapped field detecting apparatus and method capable of accurately detecting non-overlapped fields which are mostly overlapped, while overlapped fields with noise are also detected.

According to the present invention, in an overlapped field detecting apparatus, a delay unit delays a video signal, and a subtracter calculates a difference between the video signal and an output signal of the delay unit on a pixel-by-pixel basis. Also, an absolute value circuit calculates an absolute value of the difference on a pixel-by-pixel basis. Further, at least one comparator compares the absolute value of the difference with a threshold value on a pixel-by-pixel basis, and at least one accumulator counts a number of pixels when the absolute value of the difference is larger than the threshold value. A determination unit determines whether or not the number of pixels is larger than a definite value, thus determining that corresponding fields of two successive frames of the video signal are non-overlapped.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, prior art overlapped field detecting apparatuses will be explained with reference to FIGS. 1, 2, 3, 4, 5A, 5B, 6, 7A and 7B.

Figure 1:
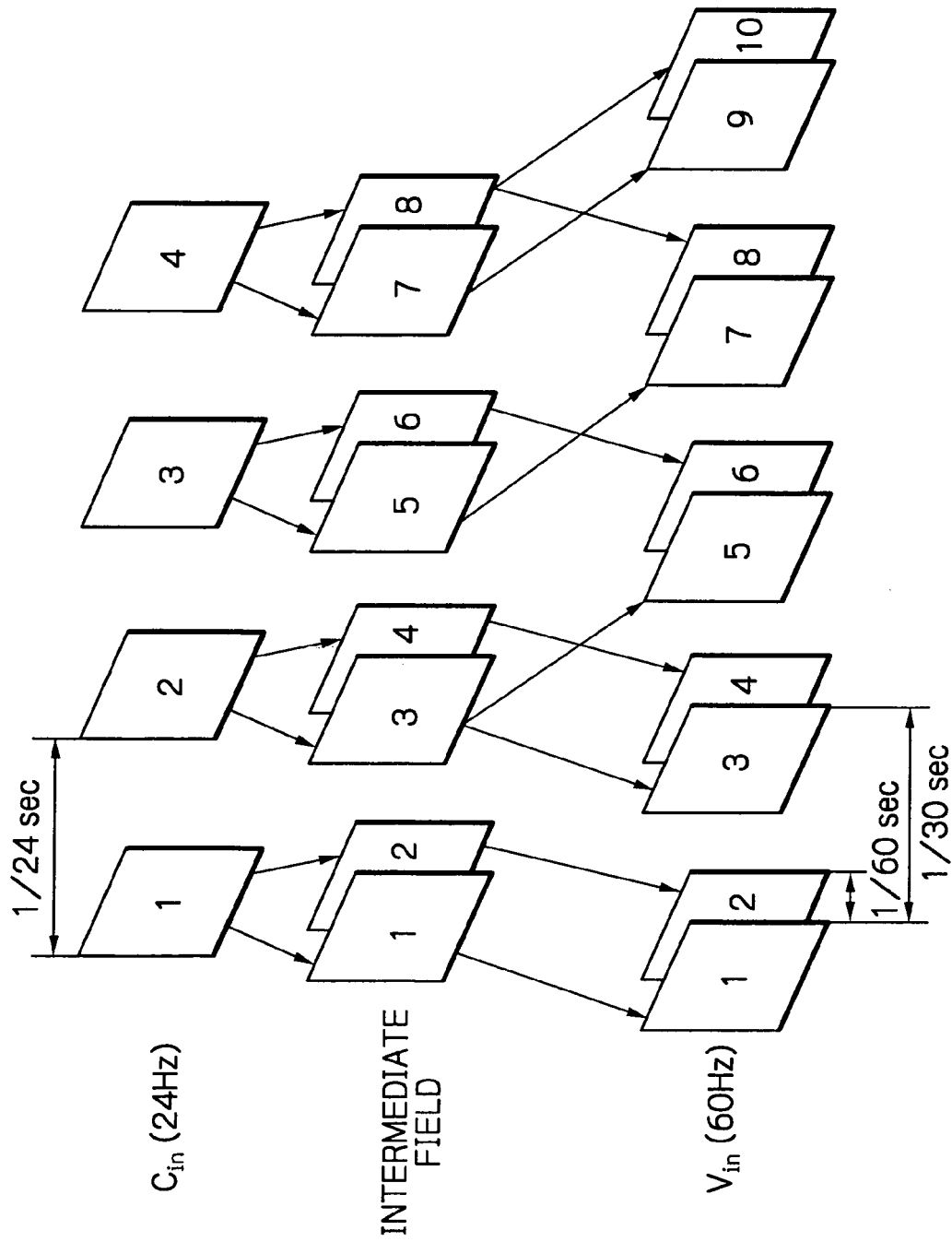
FIG. 1 is a diagram for explaining a telecine signal.

In FIG. 1, which is a diagram for explaining a telecine signal, $C_{in}$ designates a cinema signal having 24 exposure frames per second (24 Hz), while $V_{in}$ designates a telecine signal having 60 fields (30 frames) per second (60 Hz) based upon the National Television System Committee (NTSC) system. In order to convert the cinema signal $C_{in}$ into the telecine signal $V_{in}$, a 3:2 pull-down system has been adopted. First, 1st, 2nd, 3rd and 4-th exposure frames of the cinema signal $C_{in}$ are converted into 1st, 2nd, . . . , 8-th intermediate fields. In this case, one of the exposure frames of the cinema signal $C_{in}$ is divided into two intermediate fields, i.e., an odd intermediate field and an even intermediate field. Then, the 1st, 2nd, . . . , 8-th intermediate fields are converted into 1st, 2nd, . . . , 10-th fields of the telecine signal $V_{in}$. In this case, the 3-rd intermediate field is divided into the 3-rd and 5-th fields of the telecine signal $V_{in}$, and the 8-th intermediate field is divided into the 8-th and 10-th fields of the telecine signal $V_{in}$. Thus, 24 comae of the cinema signal $C_{in}$ is converted into 60 fields of the telecine signal $V_{in}$.

If a data compression process is performed upon the above-mentioned telecine signal $V_{in}$, overlapped fields are data-compressed, so that an amount of codes assigned to one field is decreased, which degrades the display quality. Therefore, before a data compression process is performed upon the above-mentioned telecine signal $V_{in}$, overlapped fields are detected and removed from the telecine signal $V_{in}$, which is realized by a data compression system as illustrated in FIG. 2.

Figure 2:
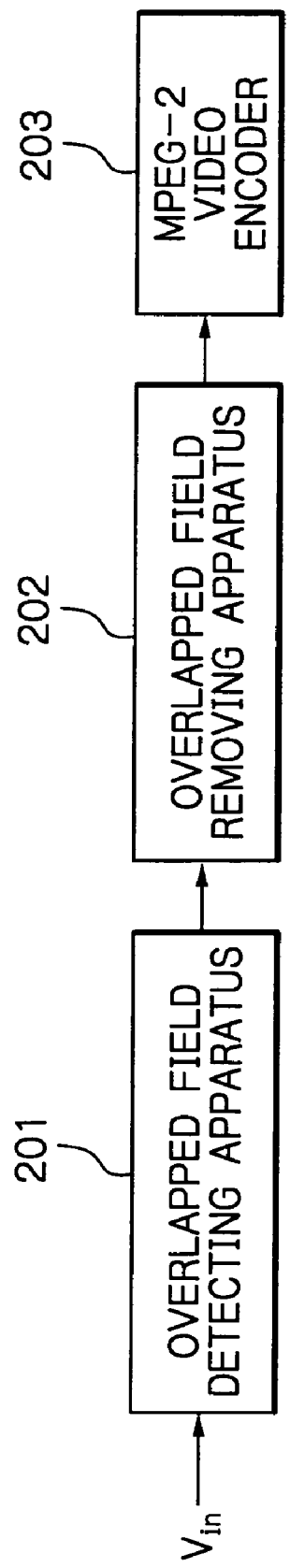
FIG. 2 is a block circuit diagram illustrating a prior art data compression system for the telecine signal of FIG. 1.

In FIG. 2, reference numeral 201 designates an overlapped field detecting apparatus for detecting overlapped fields in a telecine signal $V_{in}$, 202 designates an overlapped field removing apparatus for removing overlapped fields detected by the overlapped field detecting apparatus 201 from the telecine signal $V_{in}$, and 203 designates an Moving Picture Image Expert Group 2 (MPEG-2) video encoder for performing a data compression process upon the telecine signal Vin in which the overlapped fields are removed.

Figure 3:
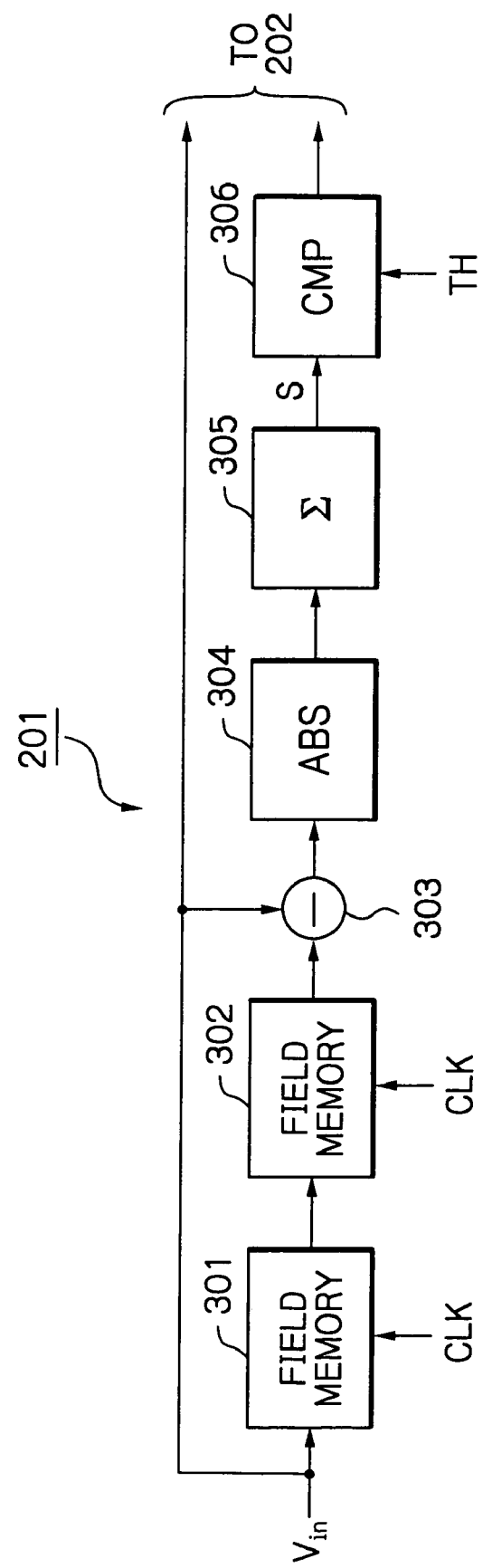
FIG. 3 is a block circuit diagram illustrating a first example of the overlapped field detecting apparatus of FIG. 2.

In FIG. 3, which illustrates a first example of the overlapped field detecting apparatus 201 of FIG. 2 (see: FIG. 5 of JP-A-9-55879), the telecine signal $V_{in}$ is delayed by field memories 301 and 302 clocked by a clock signal CLK in synchronization with the field rate of the telecine signal $V_{in}$. That is, each of the field memories 301 and 302 delays the telecine signal $V_{in}$ by one field. Therefore, one of the odd and even fields of the telecine signal $V_{in}$ is stored in the field memory 301, the other is stored in the field memory 302.

A subtracter 303 calculates a difference at each pixel between two sequential odd fields of the telecine signal $V_{in}$ or a difference at each pixel between two sequential even fields of the telecine signal $V_{in}$.

An absolute value circuit 304 calculates an absolute value of the difference at each pixel.

An accumulator 305 calculates a sum S of the absolute values calculated by the absolute value circuit 304, and a comparator 206 compares the sum S with a threshold value TH. As a result, if $S \leq TH$, the output signal of the comparator 306 shows a detection of an overlapped field. On the other hand, if S>TH, the output signal of the comparator 306 shows no detection of an overlapped field.

Note that the telecine signal $V_{in}$ associated with the output signal of the comparator 306 is supplied to the overlapped field removing unit 202, so as to remove overlapped fields from the telecine signal $V_{in}$.

Figure 4A:
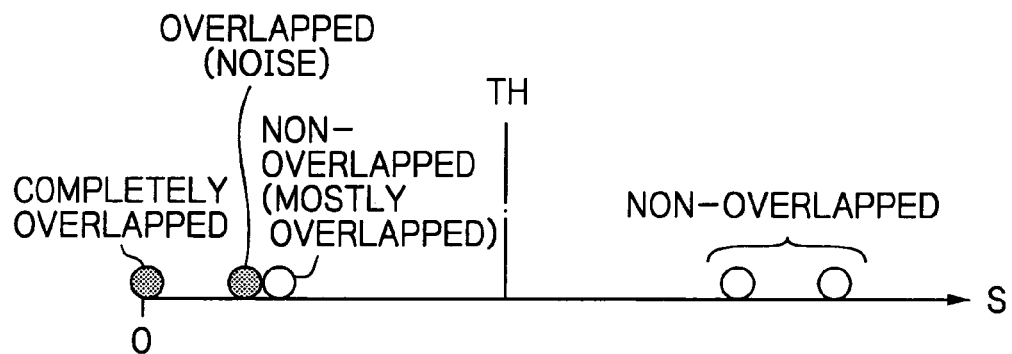
FIGS. 4A and 4B are diagrams for explaining the operation of the overlapped field detecting apparatus of FIG. 3.
Figure 4B:
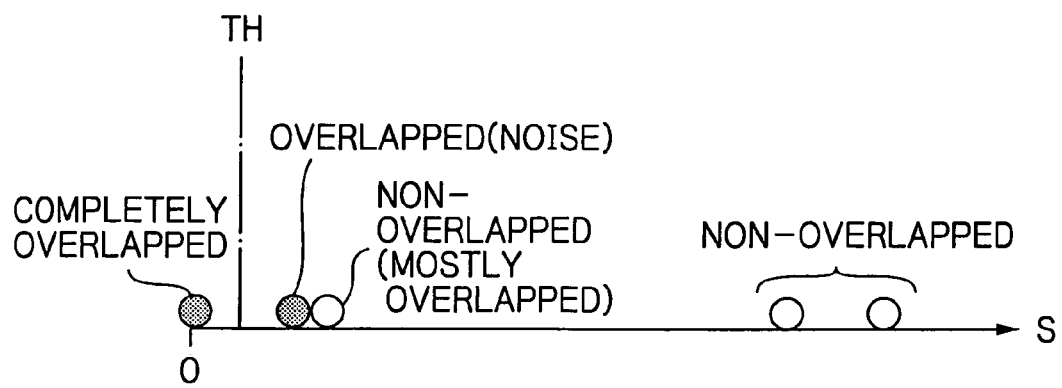
Figure 5A:
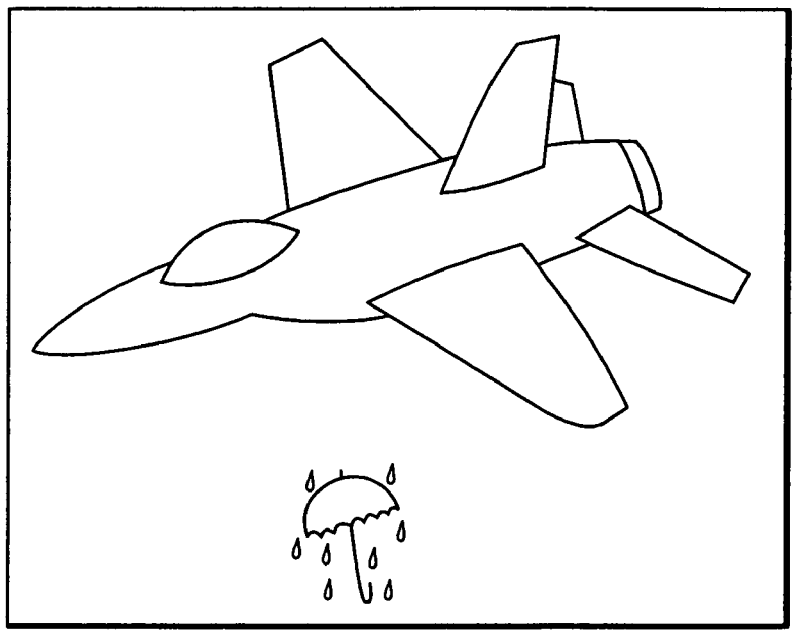
FIGS. 5A and 5B are diagrams for illustrating non-overlapped fields which are mostly overlapped.
Figure 5B:
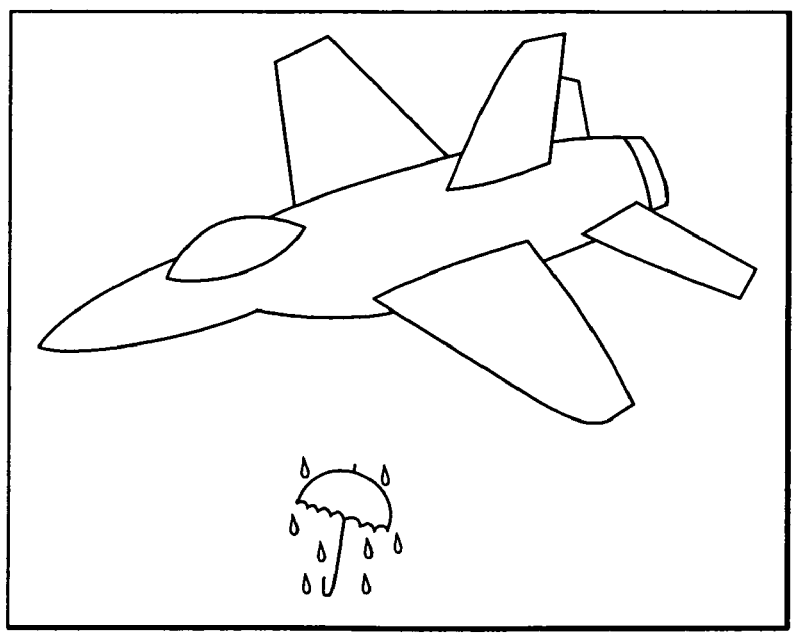

In the overlapped field detecting apparatus of FIG. 3, however, since the sum S calculated by the accumulator 305 reflects the average value of the absolute values multiplied by the number of pixels per field, the output signal of the comparator 306 cannot accurately discriminate overlapped fields from non-overlapped fields. That is, if the threshold value TH is predetermined as shown in FIG. 4A, completely overlapped fields and overlapped fields with noise can be discriminated from non-overlapped fields. However, non-overlapped fields which are mostly overlapped with only a small different part as shown in FIGS. 5A and 5B are determined to be overlapped. In order to discriminate such non-overlapped fields from overlapped fields, the threshold value TH can be made lower as shown in FIG. 4B; however, in this case, overlapped fields with noise are determined to be non-overlapped.

Figure 6:
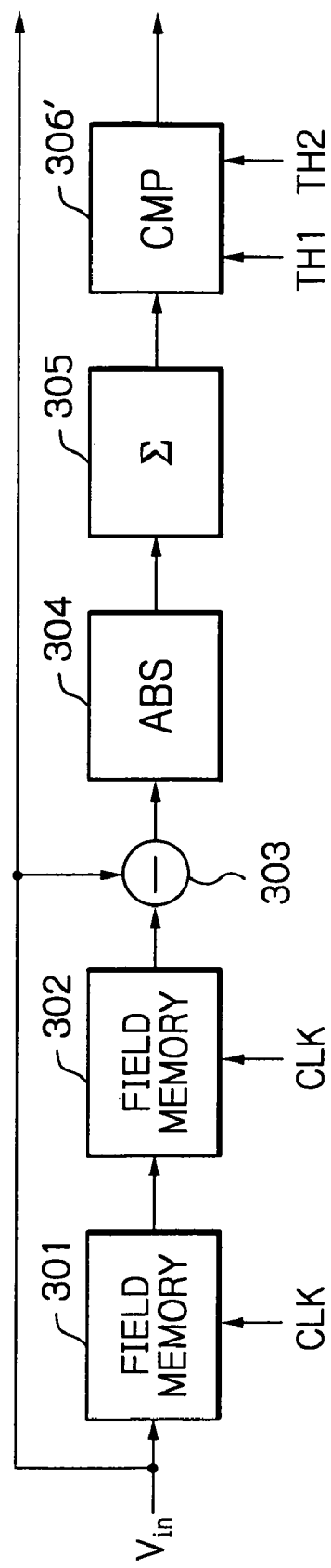
FIG. 6 is a block circuit diagram illustrating a second example of the overlapped field detecting apparatus of FIG. 2.
Figure 7A:
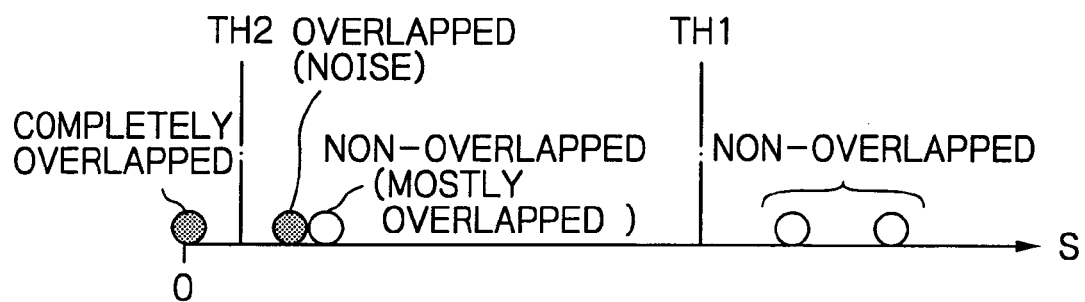
FIGS. 7A and 7B are diagrams for explaining the operation of the overlapped field detecting apparatus of FIG. 6.
Figure 7B:
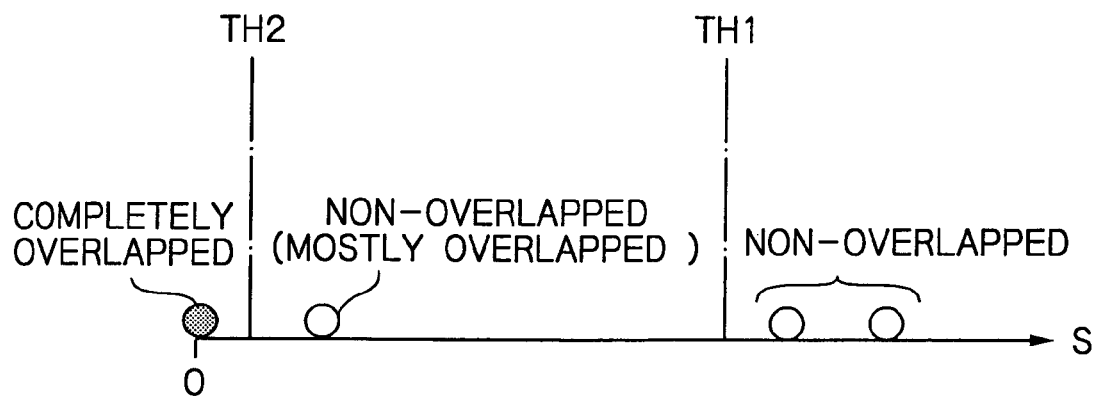

In FIG. 6, which illustrates a second example of the overlapped field detecting apparatus of FIG. 2 (see: JP-A-11-88893), a comparator 306' is provided instead of the comparator 306 of FIG. 3. That is, the comparator 306' has two threshold values TH1 and TH2 (TH1>TH2). First, the comparator 306' determines whether or not the sum S is smaller than TH1. Only when S<TH1, may overlapped fields be present, and accordingly, the comparator 306' determines whether or not the predetermined past values of the sum S are higher than TH2. That is, even when overlapped fields with noise are present as illustrated in FIG. 7A, some of the overlapped fields with noise may disappear due to the noise in the predetermined past time as illustrated in FIG. 7B, so that non-overlapped fields which are mostly overlapped can be determined to be non-overlapped.

Even in the overlapped field detecting apparatus of FIG. 6, however, since the sum S calculated by the accumulator 305 reflects the average value of the absolute values multiplied by the number of pixels per field, the output signal of the comparator 306' cannot accurately discriminate overlapped fields from non-overlapped fields. That is, if the threshold value TH2 is too high, non-overlapped fields which are mostly overlapped with only a small different part as shown in FIGS. 5A and 5B are determined to be overlapped. On the other hand, if the threshold value TH2 is too low, overlapped fields with noise are determined to be non-overlapped.

Figure 8:
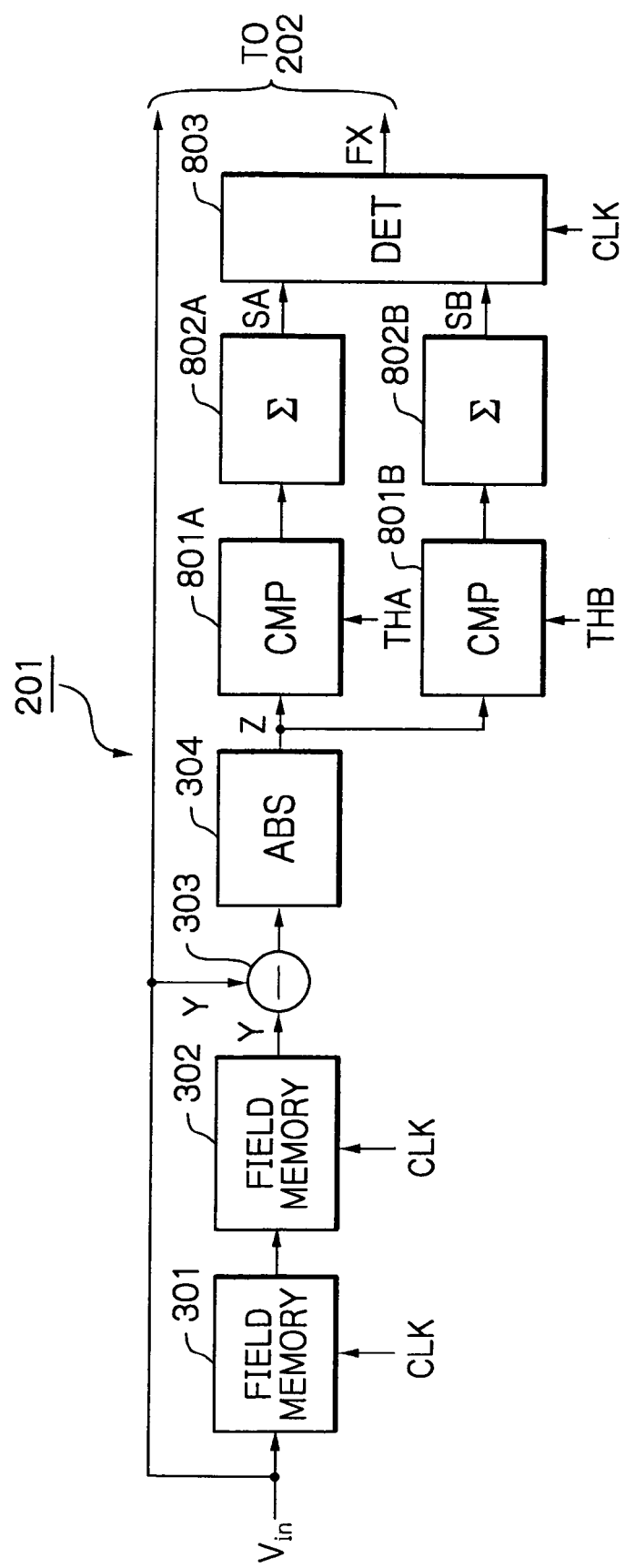
FIG. 8 is a block circuit diagram illustrating a first embodiment of the overlapped field detecting apparatus according to the present invention.

In FIG. 8, which illustrates a first embodiment of the overlapped field detecting apparatus according to the present invention, compartors 801A and 801B, accumulator 802A and 802B, and a determination unit 803 are provided instead of the accumulator 305 and the comparator 306(306')of FIG. 3(6). In this case, the field memories 301 and 302 store a luminance signal (Y signal) and chrome signals (C signals) of the telecine signal $V_{in}$; however, the substracter 303 receives only the Y signal of the field memory 302 and the Y signal of the telecine signal $V_{in}$.

In FIG. 8, the comparator 801A compares the absolute value Z of the difference at each pixel with a threshold value THA. As a result, when Z>THA, this pixel is determined to be non-overlapped, so that the accumulator 802A increments its value by 1. Similarly, the comparator 801B compares the absolute value Z of the difference at each pixel with a threshold value THB(<THA). As a result, when Z<THB, this pixel is determined to be overlapped, so that the accumulator 802B increments its value by 1.

Thus, the output value SA of the accumulator 802A shows the number of non-overlapped pixels of each field and the output value SB of the accumulator 802B shows the number of overlapped pixels of each field.

Figure 9:
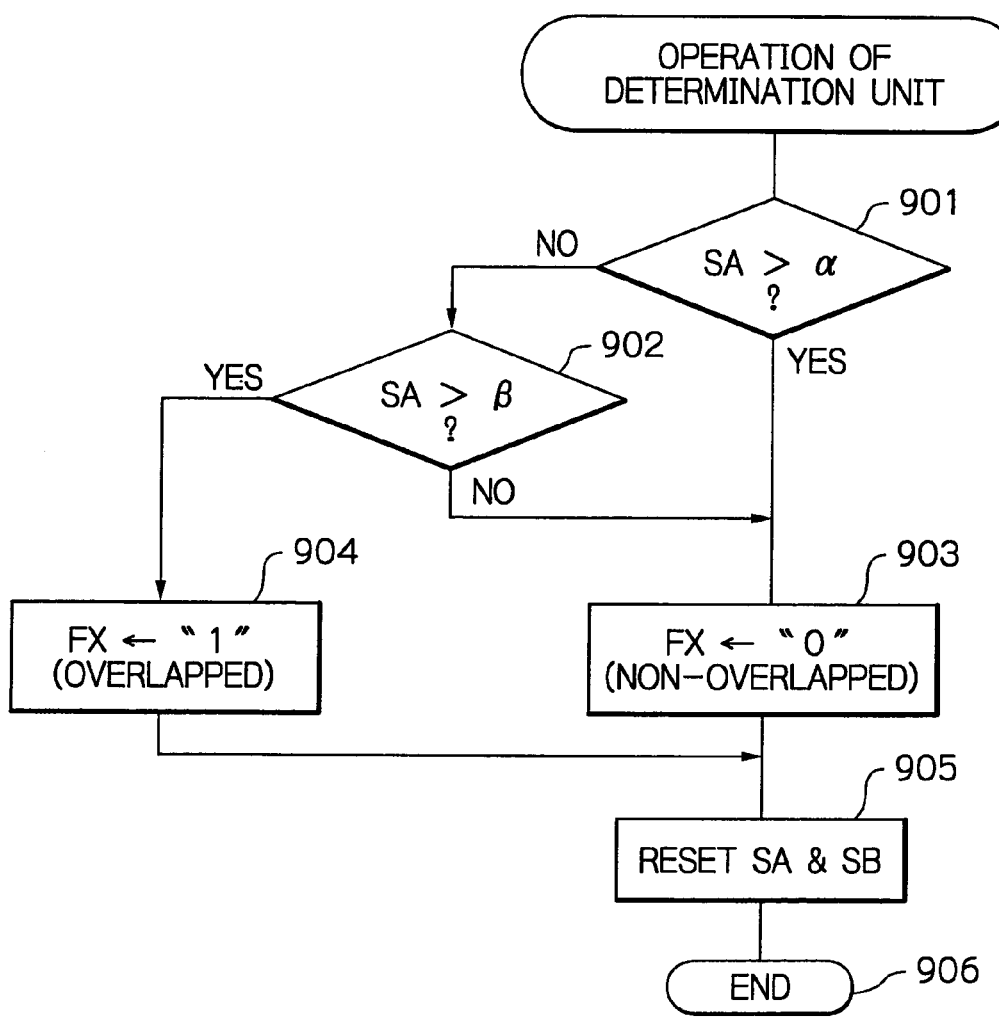
FIG. 9 is a flowchart for explaining the operation of the determination unit 803 of FIG. 8.

The operation of the determination unit 803 is illustrated in FIG. 9 which is carried out at every field time period.

First, at step 901, it is determined whether the output value SA of the accumulator 802A is larger than a small definite value α close to zero. Also, at step 902, it is determined whether the output value SB of the accumulator 802B is larger than a large definite value β which is 0.95·N, for example, where N is the number of pixels per field.

As a result, when SA>α, the control proceeds to step 903 which resets a flag FX (FX="0") for showing non-overlapped fields. On the other hand, when SA≤α and SB>β, the control proceeds to step 904 which sets the flag FX (FX "1") for showing overlapped fields. Also, when SA≤α and SB≤β, the control proceeds to step 903 which resets the flag FX (FX="0") for showing non-overlapped fields.

Then, at step 905, the output values SA and SB of the accumulators 802A and 802B are reset, thus completing the flowchart of FIG. 9 at step 906.

Figure 10A:
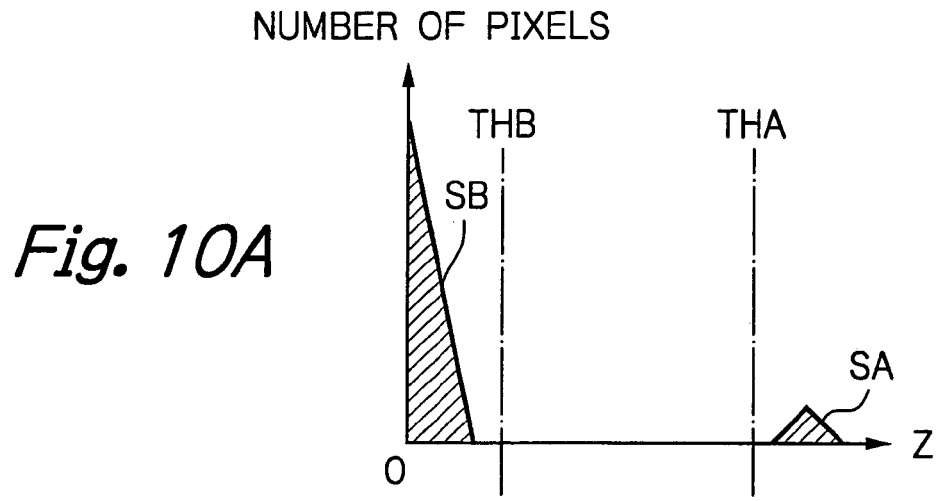
FIGS. 10A, 10B and 10C are diagrams for explaining the flowchart of FIG. 9.

If corresponding fields of two successive frames are non-overlapped but mostly overlapped with only a small different part as shown in FIGS. 5A and 5B, a distribution of pixels relative to the absolute value Z of the difference at each pixel therebetween is shown in FIG. 10A. In this case, SA>α and SB>β are expected. As a result, in FIG. 9. the control at step 901 to step 903 is carried out, so that such non-overlapped fields are clearly determined to be non-overlapped.

Figure 10B:
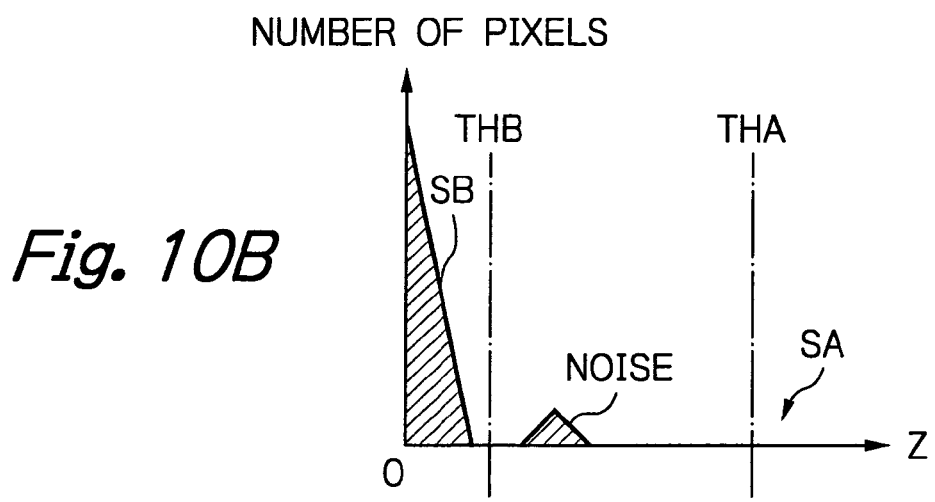

Also, if corresponding fields of two successive frames are completely overlapped, a distribution of pixels relative to the absolute value Z of the difference at each pixel therebetween is shown in FIG. 10B. In this case, SA= 0<α and SB>β are expected. As a result, in FIG. 9. the control at step 901 via step 902 to step 904 is carried out, so that such completely overlapped fields are clearly determined to be overlapped.

Note that, even if noise is added to two overlapped fields, so that a distribution of pixels as indicated by NOISE appears in FIG. 10B, SA=0 <α and SB>β are still expected. Therefore, such overlapped fields including noise are also determined to be overlapped.

Figure 10C:
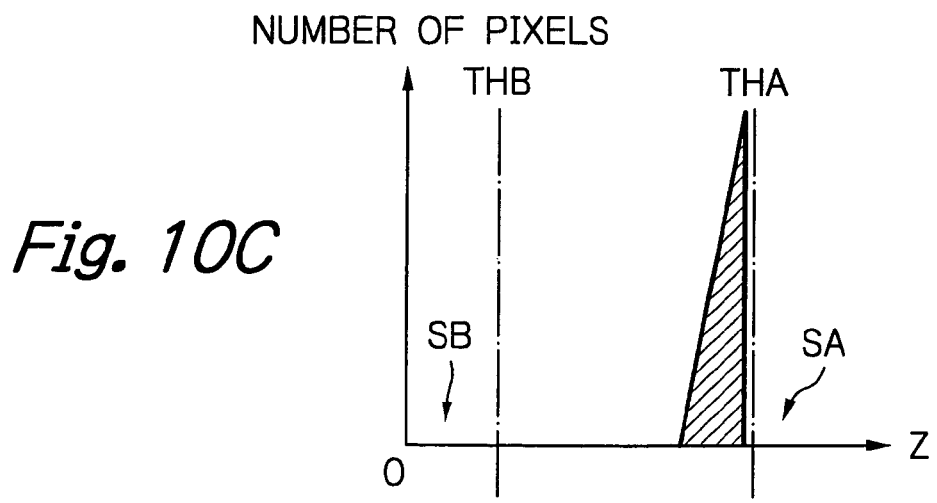

Further, if corresponding fields of two successive frames are non-overlapped, a distribution of pixels relative to the absolute value Z of the difference at each pixel therebetween is shown in FIG. 10C. In this case, SA=0<α and SB<β are expected. As a result, in FIG. 9. the control at step 901 via step 902 to step 903, so that such non-overlapped fields are clearly determined to be non-overlapped.

Thus, according to the first embodiment, non-overlapped fields which are mostly overlapped with only a small different part are clearly determined to be non-overlapped, while overlapped fields including noise are clearly determined to be overlapped.

Figure 11:
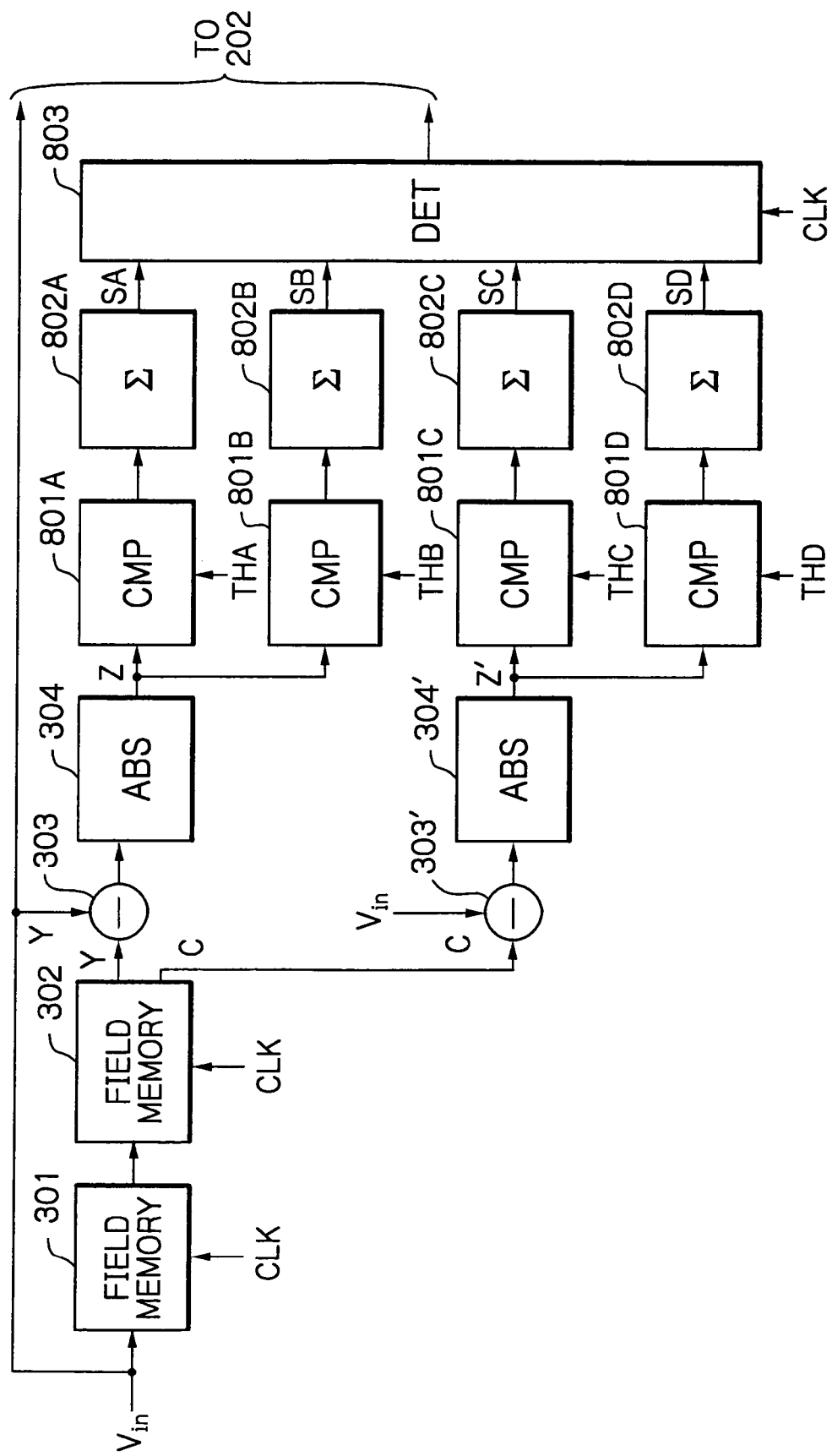
FIG. 11 is a block circuit diagram illustrating a second embodiment of the overlapped field detecting apparatus according to the present invention.

In FIG. 11, which illustrates a second embodiment of the overlapped field detecting apparatus according to the present invention, a subtracter 303', an absolute value circuit 304', comparators 801C and 801D and accumulators 802C and 802D are added to the elements of FIG. 8. In this case, the subtracter 303 receives only the Y signal component of the field memory 302 and the Y signal component of the telecine signal $V_{in}$, while the substracter 303' receives only one of the C signal components of the field memory 302 and only one of the C signal component of the telecine signal $V_{in}$. Note that a YC separating circuit (not shown) is provided to perform a YC separation upon the telecine signal $V_{in}$. In FIG. 11, the comparator 801C compares the absolute value Z' of the difference at each pixel calculated by the absolute value circuit 304' with a threshold value THC. As a result, when Z'>THC, this pixel is determined to be non-overlapped, so that the accumulator 802C increments its value by 1. Similarly, the comparator 801D compares the absolute value Z' of the difference at each pixel calculated by the absolute value circuit 304' with a threshold value THD (<THC). As a result, when Z'<THD, this pixel is determined to be overlapped, so that the accumulator 802D increments its value by 1.

Thus, the output value SC of the accumulator 802C also shows the number of non-overlapped pixels of each field and the output SD of the accumulator 802D also shows the number of overlapped pixels of each field.

Figure 12:
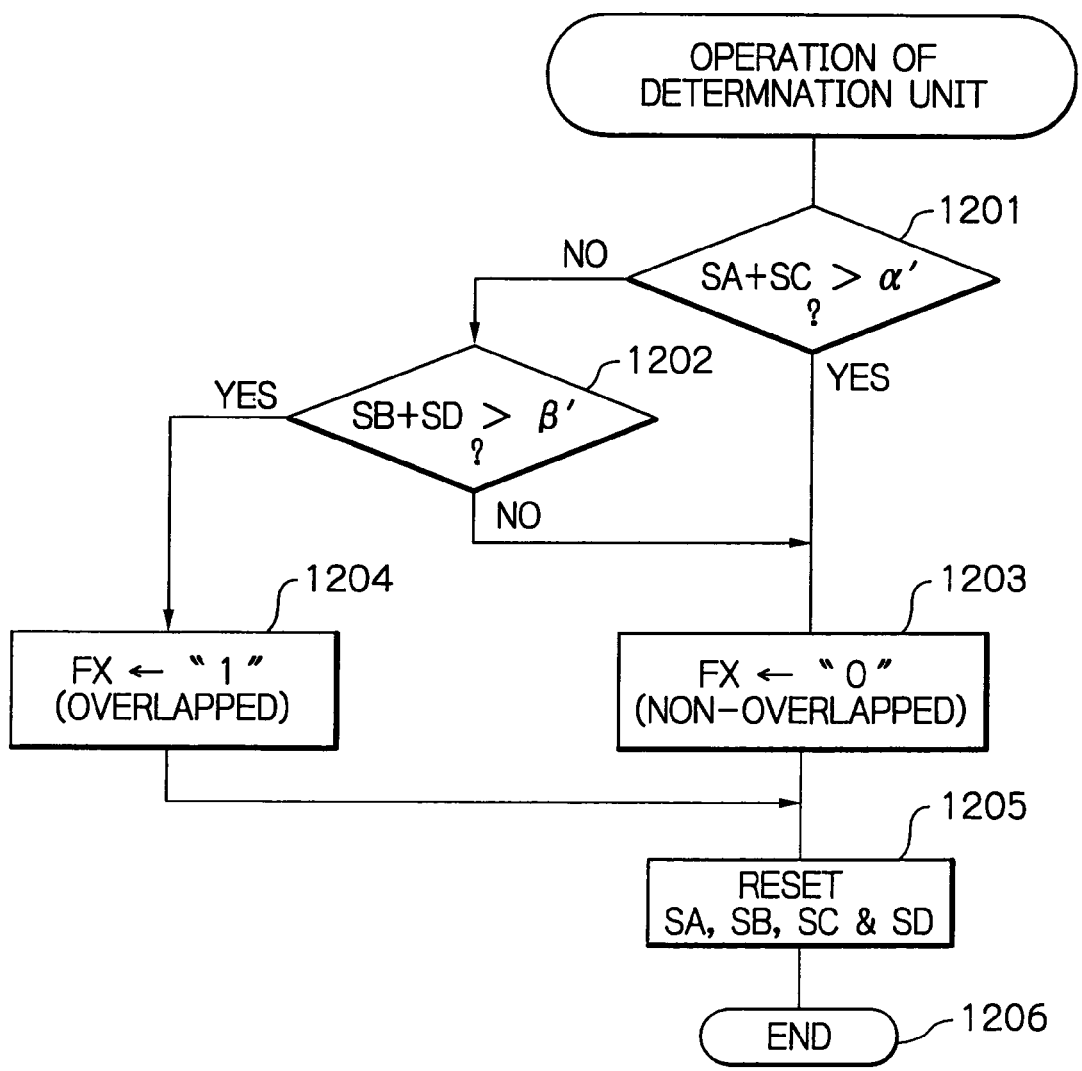
FIG. 12 is a flowchart for explaining the operation of the determination unit 803 of FIG. 11.

The operation of the determination unit 803 is illustrated in FIG. 12 which is carried out at every field time period.

First, at step 1201, it is determined whether SA+SC is larger than a small definite value α' close to zero. Also, at step 1202, it is determined whether SB+SD is larger than a large definite value β' which is 2·0.95·N, for example, where N is the number of pixels per field.

As a result, when SA+SC>α', the control proceeds to step 1203 which reset a flag FX (FX="0") for showing non-overlapped fields. On the other hand, when SA+SC≦α' and SB+SD>β', the control proceeds to step 1204 which sets the flag FX (FX="1") for showing overlapped fields. Also, when SA+SC≦α' and SB+SD≦β', the control proceeds to step 1203 which resets the flag FX (FX= "0") for showing non-overlapped fields.

Then, at step 1205, the output values SA, SB, SC and SD of the accumulators 802A, 802B, 802C and 802D are reset, thus completing the flowchart of FIG. 12 at step 1206.

Thus, according to the second embodiment, non-overlapped fields which are mostly overlapped with only a small different part are more clearly determined to be non-overlapped, while overlapped fields including noise are more clearly determined to be overlapped.

In the above described embodiments, two or more comparators and two or more accumulators are provided, however, only one comparator such as 801A and only one accumulator 802A can be provided. In this case, in FIG. 9, if SA≦α at step 901, the control proceeds directly to step 904.

As explained hereinabove, according to the present invention, non-overlapped fields which are mostly overlapped with only a small different part can be surely determined to be non-overlapped, while overlapped fields including noise can be surely determined to be overlapped.

What is claimed is:

1. An overlapped field detecting apparatus comprising:
   a delay unit for delaying a video signal;
   a subtracter, connected to said delay unit, for calculating a difference between said video signal and an output signal of said delay unit on a pixel-by-pixel basis;
   an absolute value circuit, connected to said subtracter, for calculating an absolute value of said difference on a pixel-by-pixel basis;
   at least one comparator, connected to said absolute value circuit, for comparing the absolute value of said difference with a threshold value on a pixel-by-pixel basis;
   at least one accumulator, connected to said comparator, for counting a number of pixels when the absolute value of said difference is larger than said threshold value; and
   a determination unit, connected to said accumulator, for determining whether or not the number of pixels is larger than a definite value, thus determining that corresponding fields of two successive frames of said video signal are non-overlapped.

2. The apparatus as set forth in claim 1, wherein said video signal is a telecine signal.

3. The apparatus as set forth in claim 1, wherein said delay unit comprises two successive field memories.

4. An overlapped field detecting apparatus comprising:
   a delay unit for delaying a video signal;
   a subtracter, connected to said delay unit, for calculating a difference between said video signal and an output signal of said delay unit on a pixel-by-pixel basis;
   an absolute value circuit, connected to said subtracter, for calculating an absolute value of said difference on a pixel-by-pixel basis;
   a first comparator, connected to said absolute value circuit, for comparing the absolute value of said difference with a first threshold value on a pixel-by-pixel basis;
   a second comparator, connected to said absolute value circuit, for comparing the absolute value of said difference with a second threshold value smaller than said first threshold value on a pixel-by-pixel basis;
   a first accumulator, connected to said comparator, for counting a first number of pixels when the absolute value of said difference is larger than said first threshold value;

a second accumulator, connected to said comparator, for counting a second number of pixels when the absolute value of said difference is smaller than said second threshold value; and a determination unit, connected to said first and second accumulators, for determining whether or not the first number of pixels is larger than a first definite value and determining whether or not the second number of pixels is larger than a second definite value, thus determining that corresponding fields of two successive frames of said video signal are non-overlapped or overlapped.

5. The apparatus as set forth in claim 4, wherein said video signal is a telecine signal.

6. The apparatus as set forth in claim 4, wherein said delay unit comprises two successive field memories.

7. The apparatus as set forth in claim 4, wherein said first definite value is a value close to zero and said second definite value is a value close to a total number of pixels per one field.

8. The apparatus as set forth in claim 4, wherein said video signal includes a luminance signal (Y signal) component and chroma signal (C signal) components, said subtracter calculating the difference between the Y signal component of said video signal and the Y signal component of the output signal of said delay unit.

9. The apparatus as set forth in claim 4, wherein said determination unit determines that corresponding fields of two successive frames of said video signal are non-overlapped when the first number of pixels is larger than said first definite value, determines that corresponding fields of two successive frames of said video signal are overlapped when the first number of pixels is not larger than said first definite value and the second number of pixels is larger than said second definite value, and determines that corresponding fields of two successive frames of said video signal are non-overlapped when the first number of pixels is not larger than said first definite value and the second number of pixels is not larger than said second definite value.

10. An overlapped field detecting apparatus for a video signal including a luminance signal (Y signal) component and chroma signal (C signal) components, comprising:

a delay unit for delaying said video signal;

a first subtracter, connected to said delay unit, for calculating a first difference between the Y signal component of said video signal and the Y signal component of an output signal of said delay unit on a pixel-by-pixel basis;

a second subtracter, connected to said delay unit, for calculating a second difference between one the C signal components of said video signal and one of the C signal components of an output signal of said delay unit on a pixel-by-pixel basis;

a first absolute value circuit, connected to said first subtracter, for calculating a first absolute value of said first difference on a pixel-by-pixel basis;

a second absolute value circuit connected to said second subtracter, for calculating a second absolute value of said second difference on a pixel-by-pixel basis;

a first comparator, connected to said first absolute value circuit, for comparing the first absolute value of said first difference with a first threshold value on a pixel-by-pixel basis;

a second comparator, connected to said first absolute value circuit, for comparing the first absolute value of said first difference with a second threshold value smaller than said first threshold value on a pixel-by-pixel basis;

a third comparator, connected to said second absolute value circuit, for comparing the second absolute value of said second difference with a third threshold value on a pixel-by-pixel basis;

a fourth comparator, connected to said second absolute value circuit, for comparing the second absolute value of said second difference with a fourth threshold value smaller than said third threshold value on a pixel-by-pixel basis;

a first accumulator, connected to said first comparator, for counting a first number of pixels when the first absolute value of said first difference is larger than said first threshold value;

a second accumulator, connected to said second comparator, for counting a second number of pixels when the first absolute value of said first difference is smaller than said second threshold value;

a third accumulator, connected to said third comparator, for counting a third number of pixels when the second absolute value of said second difference is larger than said third threshold value;

a fourth accumulator, connected to said fourth comparator, for counting a fourth number of pixels when the second absolute value of said second difference is smaller than said fourth threshold value;

a determination unit, connected to said first, second, third and fourth accumulators, for determining whether or not a sum of the first number of pixels and the third number of pixels is larger than a first definite value and determining whether or not a sum of the second number of pixels and the fourth number of pixels is larger than a second definite value, thus determining that corresponding fields of two successive frames of said video signal are non-overlapped or overlapped.

11. The apparatus as set forth in claim 10, wherein said video signal is a telecine signal.

12. The apparatus as set forth in claim 10, wherein said delay unit comprises two successive field memories.

13. The apparatus as set forth in claim 10, wherein said first definite value is a value close to zero and said second definite value is a value close to a total number of pixels per one field.

14. The apparatus as set forth in claim 10, wherein said determination unit determines that corresponding fields of two successive frames of said video signal are non-overlapped when the sum of the first number of pixels and the third number of pixels is larger than said first definite value, determines that corresponding fields of two successive frames of said video signal are overlapped when the sum of the first number of pixels and the third number of pixels is not larger than said first definite value and the sum of the second number of pixels and the fourth number of pixels is larger than said second definite value, and determines that corresponding fields of two successive frames of said video signal are non-overlapped when the sum of the first number of pixels and the third number of pixels is not larger than said first definite value and the sum of the second number of pixels and the fourth number of pixels is not larger than said second definite value.

15. An overlapped field detecting method comprising the steps of:

delaying a video signal to generate a delayed video signal;

calculating a difference between said video signal and said delayed video signal on a pixel-by-pixel basis;

calculating an absolute value of said difference on a pixel-by-pixel basis;

comparing the absolute value of said difference with a threshold value on a pixel-by-pixel basis;

counting a number of pixels when the absolute value of said difference is larger than said threshold value; and determining whether or not the number of pixels is larger than a definite value, thus determining that corresponding fields of two successive frames of said video signal are non-overlapped.

16. The method as set forth in claim 15, wherein said video signal is a telecine signal.

17. An overlapped field detecting method comprising the steps of:

delaying a video signal to generate a delayed video signal;

calculating a difference between said video signal and said delayed video signal on a pixel-by-pixel basis;

calculating an absolute value of said difference on a pixel-by-pixel basis;

comparing the absolute value of said difference with a first threshold value on a pixel-by-pixel basis;

comparing the absolute value of said difference with a second threshold value smaller than said first threshold value on a pixel-by-pixel basis;

counting a first number of pixels when the absolute value of said difference is larger than said first threshold value;

counting a second number of pixels when the absolute value of said difference is smaller than said second threshold value;

determining whether or not the first number of pixels is larger than a first definite value; and determining whether or not the second number of pixels is larger than a second definite value, thus determining that corresponding fields of two successive frames of said video signal are non-overlapped or overlapped.

18. The method as set forth in claim 17, wherein said video signal is a telecine signal.

19. The method as set forth in claim 17, wherein said first definite value is a value close to zero and said second definite value is a value close to a total number of pixels per one field.

20. The method as set forth in claim 17, wherein said video signal includes a luminance signal (Y signal) component and chroma signal (C signal) components, said difference calculating step calculating the difference between the Y signal of said video signal and the Y signal component of said delayed video signal.

21. The method as set forth in claim 17, wherein said determining step determines that corresponding fields of two successive frames of said video signal are non-overlapped when the first number of pixels is larger than said first definite value, determines that corresponding fields of two successive frames of said video signal are overlapped when the first number of pixels is not larger than said first definite value and the second number of pixels is larger than said second definite value, and determines that corresponding fields of two successive frames of said video signal are non-overlapped when the first number of pixels is not larger than said first definite value and the second number of pixels is not larger than said second definite value.

22. An overlapped field detecting method for a video signal including a luminance signal (Y signal) component and chroma signal (C signal) components, comprising the steps of:

delaying said video signal to generate a delayed video signal;

calculating a first difference between the Y signal component of said video signal and the Y signal component of said delayed video signal on a pixel-by-pixel basis;

calculating a second difference between one of the C signal components of said video signal and one of the C signal components of said delayed video signal on a pixel-by-pixel basis;

calculating a first absolute value of said first difference on a pixel-by-pixel basis;

calculating a second absolute value of said second difference on a pixel-by-pixel basis;

comparing the first absolute value of said first difference with a first threshold value on a pixel-by-pixel basis;

comparing the first absolute value of said first difference with a second threshold value smaller than said first threshold value on a pixel-by-pixel basis;

comparing the second absolute value of said second difference with a third threshold value on a pixel-by-pixel basis;

comparing the second absolute value of said second difference with a fourth threshold value smaller than said third threshold value on a pixel-by-pixel basis;

counting a first number of pixels when the first absolute value of said first difference is larger than said first threshold value;

counting a second number of pixels when the first absolute value of said first difference is smaller than said second threshold value;

counting a third number of pixels when the second absolute value of said second difference is larger than said third threshold value;

counting a fourth number of pixels when the second absolute value of said second difference is smaller than said fourth threshold value;

determining whether or not a sum of the first number of pixels and the third number of pixels is larger than a first definite value, and determining whether or not a sum of the second number of pixels and the fourth number of pixels is larger than a second definite value, thus determining that corresponding fields of two successive frames of said video signal are non-overlapped or overlapped.

23. The method as set forth in claim 22, wherein said video signal is a telecine signal.

24. The method as set forth in claim 22, wherein said first definite value is a value close to zero and said second definite value is a value close to a total number of pixels per one field.

25. The method as set forth in claim 22, wherein said determining step determines that corresponding fields of two successive frames of said video signal are non-overlapped when the sum of the first number of pixels and the third number of pixels is larger than said first definite value, determines that corresponding fields of two successive frames of said video signal are overlapped when the sum of the first number of pixels and the third number of pixels is not larger than said first definite value and the sum of the second number of pixels and the fourth number of pixels is larger than said second definite value, and determines that corresponding fields of two successive frames of said video signal are non-overlapped when the sum of the first number of pixels and the third number of pixels is not larger than said first definite value and the sum of the second number of pixels and the fourth number of pixels is not larger than said second definite value.

* * * * *